Oct. 16, 1945.  L. E. HARDING  2,387,066
MOUNT SUPPORT
Filed March 22, 1944
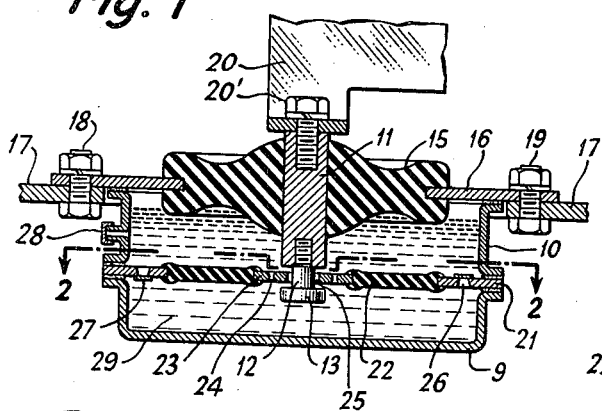
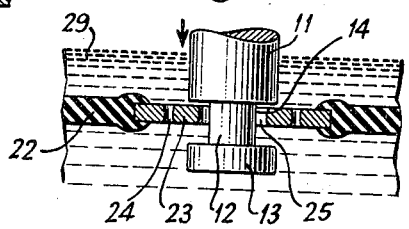
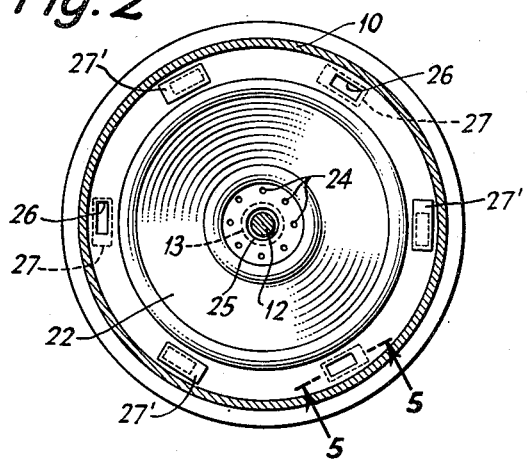
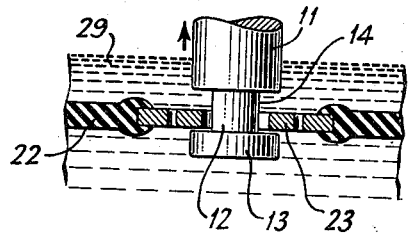
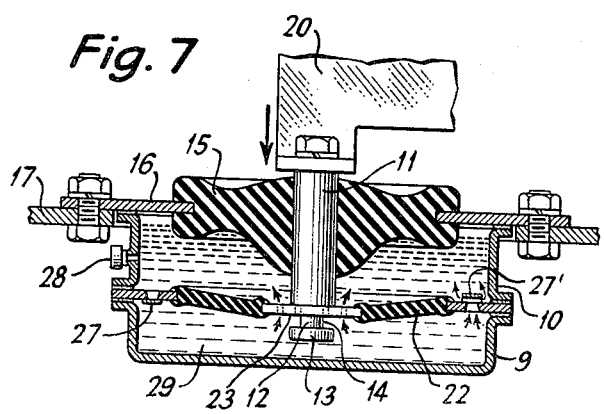
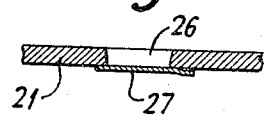
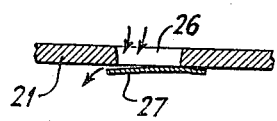
INVENTOR
LLOYD E. HARDING
BY
William A. Zalesak
ATTORNEY Patented Oct. 16, 1945

2,387,066

UNITED STATES PATENT OFFICE 2,387,066

MOUNT SUPPORT

Lloyd E. Harding, Bradley Beach, N. J., assignor of one-fifth to Edmund J. Lada, Woodhaven, N. Y., and one-fifth to William A. Zalesak, Union, N. J.

Application March 22, 1944, Serial No. 527,535

10 Claims. (Cl. 248—358)

My invention relates to mounts for equipment subjected to shock and vibration, more particularly to improved methods for resiliently supporting equipment and for damping vibration.

The present application is an improvement over the device shown and claimed in my copending application, Serial No. 513,848, filed December 11, 1943.

As is well known in connection with supporting equipment, two types of disturbance must be provided for, that is the so-called steady state vibration and shock. Vibration is an oscillatory condition which exists over a period of time and it has the characteristic of a sine wave or a combination of sine waves.

It is also well known that every resiliently mounted system has a natural period of vibration at which it will oscillate before coming to rest if subjected to an impulse. Normally when subjected to shock, oscillation at this natural frequency occurs for a very short period. However, if excited by a source of steady vibration of the natural frequency of the mount, violent oscillation of the mounting system will occur. These types of vibration present different problems in protecting equipment against vibration and shock.

Viscous damping has been found to be an excellent means to neutralize vibration and to provide shock isolation. A familiar form of such viscous damping device is the hydraulic shock absorber which makes use of a piston travelling in a cylinder and displacing a fluid through apertures in the piston or by means of side vents or pipes connecting the two ends of the cylinder. The cylinder is attached to one unit of the moving parts, while the piston is attached to the other. Movement of the two parts with relation to each other is retarded, slowed down or damped by the piston action on displacing the fluid from one section of the cylinder to the other. In this operation work is performed in forcing fluid through vents and energy of the shock or vibration is dissipated.

There are, however, practical objections to this type of shock absorber. The maintenance cost is high, as is the case with any constantly acting device where there is close tolerance between two moving members. In certain types of equipment it is not possible to make a unit of small enough size to fit it to the design or the space available.

One form of device has been developed to replace the damping shock absorber described. It makes use of rubber or rubber-like material made up into mounts and used either with rubber in shear or in compression. A rubber disc or plate is bonded to a metal collar or ring at its edges and the collar or ring used as a mounting plate attached to a stationary support. A centrally positioned rod or tube is bonded to the rubber at the center of the rubber disc or plate and to this is secured the load equipment, which is to be protected against vibration and shock. The shock absorbing action is supposed to result from flexing of the rubber disc and the diaphragm-like motion as the load is set into vibration or subjected to shock.

While this type of shock absorber provides a solution for the question of size, it does not have the energy dissipating abilities of the piston type shock absorber. Further, if it happens that the natural frequency of the vibration of the mount and equipment approaches that of the disturbing shock, resonance is established and the mount becomes useless and may even cause the equipment supported as a load to destroy itself. While the last mentioned form of absorber can be designed to isolate vibration of the load over a certain range of frequencies, it cannot at the same time be designed to protect against shock in addition to the vibration, for example, when it is used in connection with planes which are subjected to landing shocks, where a shock mount is needed to dissipate energy over a wide range of frequencies, and limit amplitude of movement at the resonant frequency of the mount.

Again in connection with the rubber mounted support, rubber shoulders are provided which act as bumpers when the shock received is greater than that for which the mount was designed. Without the provision of a bumper shoulder, the load would move beyond the permissible limits and perhaps tear itself loose by tearing the rubber from its bond with the metal, or tearing the rubber itself. The action of the equipment hitting the bumper, however, results in damage to the equipment.

The two methods of reducing vibration transmission are the so-called isolation type and the absorption type and the difference between the two is clear. Isolation means the storing of vibrational energy during one part of a cycle and release during another part as where resilient mounts are used. Absorption is referred to as having a damping effect on the vibrating system and converts energy into heat. Absorption reduces the motion of the mounted system when the action of resilient elements would increase the motion as in the case of resonance, transient effects or rebound. However, whenever a resilient support or mount is used to reduce vibration, a damping effect detracts from the effectiveness of such reduction. Resilient material, such as rubber, has only a limited absorptive capacity. The addition of means for absorbing shock to a resilient mount can under certain conditions be beneficial. It would, therefore, be desirable to have a mount arrangement which will resiliently support the load, but have a pronounced damping effect only at the resonant frequency or when shock is experienced.

It is, therefore, a principal object of my invention to provide an improved type of mount for resiliently supporting equipment which will dissipate shock energy and limit amplitude of movement at resonant frequency.

Another object of my invention is to provide such a device which will limit vibration at resonant frequency.

A still further object of my invention is to provide a mount which has the advantages of viscous damping but which at the same time is sufficiently small and compact to be utilized with equipment where space requirements are rigid.

A further object of my invention is to provide such a device in which the damping action or absorption of shock takes place only at the resonant frequency or on shock.

The novel features which I believe to be characteristic of my invention are set forth with particularity in the appended claims, but the invention itself will best be understood by reference to the following description taken in connection with the accompanying drawing in which Figure 1 is a longitudinal section of a mount support made in accordance with my invention in a position of rest, Figure 2 is a transverse section taken along the line 2—2 of Figure 1, Figures 3 and 4 show details of the device shown in Figures 1 and 2 during operation, Figures 5 and 6 show further details of the device shown in Figure 1 during operation, and Figure 7 is a longitudinal section of the mount support shown in Figure 1 when placed under load.

In accordance with my invention I provide both the advantages of rubber mounting, permitting small compact units, and also utilizing viscous damping to dissipate shock energy at only such times as the load is subjected to shock or vibration at the natural frequency of the mount and supported load.

In accordance with my invention I provide a chamber including a bottom cup-shaped portion 9 and an upper portion 10 secured thereto in any well-known manner, such as welding or bolting. Mounted within the chamber and axially thereof for vertical and lateral movement is a central element which may be a tube, a rod or a sleeve 11 having secured to its lower end an element 12 provided with a flange 13. The lower end of the element 11 and the upper surface of the flange 13 provide shoulders on opposite sides of the restricted or reduced portion 14 and having specific functions as will be described.

The post 11 has bonded to it a transverse resilient element 15, which in turn is secured to a cover plate 16 sealed for example as by welding to the upper portion 10 of the chamber. Thus the post 11 is resiliently mounted at the top of the device. The unit may be supported on a stationary mounting bracket 17, for example, by nuts and bolts 18 and 19 and the unit supporting the load 20 may be secured to the post member 11 by the bolt 20'.

In accordance with my invention I mount between the upper and lower halves of the chamber a ring-like element 21 bonded to a resilient diaphragm 22, which is in turn bonded to an inner ring-like element or flange 23 provided with a plurality of apertures 24 and a central aperture 25, in which the element 12 may freely move. Positioned around the ring-like element 21 are a plurality of apertures or ports 26, some of which are closed by spring leaf member 27 which may be welded to the under side of the ring, and the others closed by means of spring leaf member 27' welded to the top of the ring. The parts may be given a flared shape as shown to decrease turbulence. Fluid, such as oil, may be introduced into the chamber through port 28.

As shown in Figures 3 and 4, the central post 11 and the load 20 may have relative movement with respect to the member 23 and diaphragm 22 without in any way effecting movement or movement to only a slight extent inasmuch as little if any fluid 29 is displaced during normal operation from one side of the diaphragm to the other. Thus the device under these conditions produces an approximation of a free body so that vibratory forces are isolated from the load or equipment being supported and the full benefit of the mounting for these operating conditions is realized without detracting from the effectiveness of the isolation action by a damping action.

If, however, the support and the load are subjected to shock the forces producing relative movement between the load and its support increase the movement of the post 11 so that the shoulders provided by the post 11 and flange 13 alternatively engage the ring member 23, bringing into action the damping effect of the diaphragm 22. As the post 11 and load 20 move downwardly with respect to the chamber, fluid is forced from the under side of the diaphragm to the upper side, producing a damping action. Normally the flow will be through the apertures or parts 24 of the central ring member 23 and in case of excessive shocks where large pressures are built up the spring leaf elements 27 and 27' act as indicated to relieve these excess pressures. This action is illustrated in Figure 7. While oil may be used as the fluid, I have obtained excellent results with air alone.

Thus for frequencies other than the resonant frequency or shock, the amplitude of the movement of the post 11 is not great enough to cause the shoulders of the post and flange to engage the ring or disc 23. When the impressed frequencies approach the resonant or natural frequency of the mount, the vertical movement of the post increases until the shoulders engage the damping disc, causing the disc and diaphragm to move up and down against the damping action of the fluid moving through the ports 24 and during other conditions through ports 26.

Tests on equipment of this kind have shown that the maximum amplitude at the resonant frequency has been limited to 1.4 times the impressed amplitude. Without this action the maximum amplitude at resonant frequency reaches twenty times the impressed amplitude, which is the cause of wrecked equipment or damaged loads.

Thus, good isolation from vibration is obtained under other than resonant frequency and shock, and at resonant frequency and shock the damping action limits the amplitude.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A mount for supporting a load subject to vibration and shock and including a member to be fixed to a load and having axial movement, a supporting element adapted to be secured to a fixed support and having a central opening, and resilient means fixed between said member and said element and resiliently supporting said member within said opening, means associated with said member and said element and providing viscous damping, said means including an apertured element and a pot-shaped element containing fluid and within which said apertured element is mounted for axial movement, said fluid having access to opposite sides of said apertured element through said apertures and means for causing said apertured element to have axial movement only when the supported load is subjected to movement beyond predetermined limits due to its natural frequency of vibration or to shock.

2. A mount for supporting a load subject to vibration and shock and including a cup-shaped member closed at one end by a transverse flexible resilient member, an elongated rod-like load supporting element positioned centrally of said resilient member and extending axially into said cup-shaped member, the inner end of said rod-like load supporting element being provided with a restricted portion for providing oppositely disposed shoulders at either end of said restricted portion, a transverse diaphragm extending across said cup-shaped member and having means provided with apertures surrounding and adjacent said restricted portion of said rod-like supporting element, said rod-like supporting element having relative motion with respect to said diaphragm, and a fluid within said cup-shaped member, said fluid having access to opposite sides of said diaphragm through said apertures, said diaphragm having movement only when the shoulders of said load supporting element engage said apertured means.

3. A mount for supporting a load subject to vibration and shock and including a member having a transverse flexible resilient member, an elongated rod-like load supporting element positioned centrally of said resilient member and axially movable, one end of said rod-like load supporting element being provided with a restricted portion for providing oppositely disposed shoulders at either end of said restricted portion, a cup-shaped member, said load supporting element extending into said cup-shaped member, a transverse diaphragm extending across said cup-shaped member and having means provided with apertures and surrounding and closely adjacent said restricted portion of said rod-like load supporting element and having relative motion with respect thereto, and a fluid within said cup-shaped member, said fluid having access to opposite sides of said diaphragm through said apertures, said diaphragm having movement only when the shoulders of said load supporting element engage said apertured means.

4. A mount for supporting a load subject to vibration and shock and including a member having a transverse flexible resilient portion, an elongated rod-like load supporting element supported by said resilient portion and having axial movement, the inner end of said rod-like load supporting element being provided with a restricted portion for providing oppositely disposed shoulders at either end of said restricted portion, a cup-shaped member into which the rod-like load supporting element extends, a transverse diaphragm extending across said cup-shaped member and having apertures therein, said load supporting element extending through said diaphragm and having relative motion with respect thereto, and a fluid within said cup-shaped member, said fluid having access to opposite sides of said diaphragm through the apertures thereof, said rod-like load supporting element having means for engaging said diaphragm, said diaphragm having movement only when the means of said load supporting element engage said diaphragm when said load supporting element moves beyond predetermined limits.

5. A mount for supporting a load subject to vibration and shock and including a cup-shaped member having a fluid therein, an elongated rod-like load supporting element positioned centrally of said cup-shaped member and extending axially into said cup-shaped member, and means including resilient means extending between said cup-shaped member and said elongated rod-like load supporting element, the inner end of said elongated rod-like load supporting element having a portion of reduced dimensions and provided with shoulders at either end of the reduced portion, a diaphragm extending transversely of said cup-shaped member intermediate said cup-shaped member and including a ring-like member mounted in the walls of said cup-shaped member and extending toward said rod-like load supporting element, an inner ring-like member mounted within the reduced portion of said rod-like load supporting element and having relative movement with respect therewith, said ring-like members being provided with apertures and a resilient diaphragm connected between said ring-like members, said shoulders engaging said inner ring-like member when the resonant frequency of vibration of the supported load or shock cause movement beyond predetermined limits of said rod-like load supporting element with respect to said cup-shaped member, and resilient means closing the apertures in the ring-like member supported from the wall of said cup-shaped member which function when excessive pressures are developed in the fluid in said cup-shaped member.

6. A mount for supporting a load subject to vibration and shock and including a member having an opening therein, an elongated rod-like load supporting element positioned centrally of said opening, resilient means extending between said member and said elongated rod-like load supporting element, one end of said elongated rod-like load supporting element having a portion of reduced dimensions and provided with shoulders at either end of said reduced portion, a cup-shaped member into which said load supporting element extends, a diaphragm extending transversely of said cup-shaped member intermediate and including a ring-like element mounted in the wall of said cup-shaped member and extending toward said rod-like load supporting element, an inner ring-like member mounted within the reduced portion of said rod-like load supporting element and having relative movement with respect therewith, said inner ring-like member being provided with apertures and a resilient diaphragm connected between said ring-like members, said shoulders engaging said inner ring-like member when the resonant frequency of vibration of the supported load or shock causes movement of said rod-like element beyond predetermined limits with respect to said cup-shaped member.

7. A mount for supporting a load subject to vibration and shock and including a member having an opening therein, an elongated rod-like load supporting element positioned within said opening and having axial movement therein, resilient means extending between said member and said elongated rod-like load supporting element, one end of said elongated rod-like load supporting element having a portion of reduced dimensions and provided with shoulders at either end of the reduced portion, a cup-shaped member into which said load supporting element extends, a resilient diaphragm supported by and extending transversely of said cup-shaped member, and including a ring-like member mounted within the reduced portion of said rod-like load supporting element and having relative movement with respect therewith, said ring-like member being provided with apertures, said shoulders engaging said ring-like member when the resonant frequency of vibration of the supported load or shock causes movement of said rod-like element beyond predetermined limits with respect to said cup-shaped member.

8. A mount for supporting a load subject to vibration and shock and including a member having an opening, an elongated rod-like load supporting element positioned within said opening and having axial movement, resilient means extending between said member and said elongated rod-like load supporting element, a cup-shaped member into which the rod-like supporting element extends, a resilient diaphragm supported by and extending transversely of said cup-shaped member and including a ring-like member through which the rod-like load supporting element extends, said rod-like load supporting element and diaphragm having relative movement, and means on said rod-like load supporting element for engaging said ring-like member, said ring-like member being provided with apertures, said ring-like member being engaged only when the resonant frequency of vibration of the supported load or shock causes movement of said rod-like load supporting element beyond predetermined limits with respect to said cup-shaped member.

9. A mount for supporting a load subjected to vibration and shock and including a member to be fixed to a load and subjected to axial movement, a supporting element adapted to be secured to a fixed support and provided with a central aperture and resilient means fixed between said member and said element and supporting said member within said aperture, and means associated with said member and said element and providing viscous damping, said means including a hollow member containing a fluid, said axially movable member extending within said hollow member, a transverse flange submerged in said fluid for movement within said fluid, said axially movable member extending through said flange and having relative movement therewith, and means on said axially movable member for causing said flange to have axial movement only when said axially movable member is subjected to movement beyond predetermined limits.

10. A mount for supporting a load subjected to vibration and shock and including a hollow member adapted to be secured to a fixed support, a load supporting member to be fixed to a load and subjected to axial movement and extending within the hollow member, a resilient transverse diaphragm at one end of said hollow member and connected between said hollow member and said load supporting member, a second resilient diaphragm extending between said hollow member and said load supporting member, a transverse flange within said hollow member and extending transversely of the load supporting member, said hollow member containing liquid in which said transverse flange is submerged and provides viscous damping, said load supporting member extending through said flange and having relative movement therewith, and means on said load supporting member for engaging said flange for causing movement of said flange only when the supported load is subjected to movement beyond predetermined limits.

LLOYD E. HARDING.